(12) United States Patent
Rabb

(10) Patent No.: US 7,911,671 B2
(45) Date of Patent: Mar. 22, 2011

(54) APPARATUS AND METHOD FOR PROVIDING TRUE TIME DELAY IN OPTICAL SIGNALS USING A FOURIER CELL

(75) Inventor: David J. Rabb, Columbus, OH (US)

(73) Assignee: The Ohio State University, Columbus, OH (US)

( * ) Notice: Subject to any disclaimer, the term of this patent is extended or adjusted under 35 U.S.C. 154(b) by 759 days.

(21) Appl. No.: 11/801,015

(22) Filed: May 8, 2007

(65) Prior Publication Data
US 2009/0015899 A1 Jan. 15, 2009

Related U.S. Application Data

(60) Provisional application No. 60/799,285, filed on May 10, 2006.

(51) Int. Cl.
*G02B 26/08* (2006.01)
(52) U.S. Cl. .................. 359/223.1; 359/201.2; 359/900
(58) Field of Classification Search ............... 359/201.1, 359/201.2, 900; 398/53
See application file for complete search history.

(56) References Cited

U.S. PATENT DOCUMENTS

| | | | |
|---|---|---|---|
| 3,428,391 A | 2/1969 | Newcomer | |
| 3,463,571 A | 8/1969 | Boehm et al. | |
| 3,755,676 A | 8/1973 | Kinsel | |
| 3,892,468 A | 7/1975 | Duguay | |
| 4,225,938 A | 9/1980 | Turpin | |
| 4,344,671 A | 8/1982 | Lang | |
| 4,474,434 A | 10/1984 | Carlsen et al. | |
| 4,474,435 A | 10/1984 | Carlsen et al. | |
| 4,546,249 A | 10/1985 | Whitehouse et al. | |
| 4,929,956 A | 5/1990 | Lee et al. | |
| 5,018,816 A | 5/1991 | Murray et al. | |
| 5,018,835 A | 5/1991 | Dorscher | |
| 5,117,239 A | 5/1992 | Riza | |
| 5,231,405 A | 7/1993 | Riza | |
| 5,274,385 A | 12/1993 | Riza | |
| 5,276,758 A | 1/1994 | Hughes | |

(Continued)

FOREIGN PATENT DOCUMENTS

JP 10333089 A2 12/1998

(Continued)

OTHER PUBLICATIONS

U.S. Appl. No. 11/182,111, Non-final Office Action, mailed Jan. 15, 2008.

(Continued)

*Primary Examiner* — James Phan
(74) *Attorney, Agent, or Firm* — Calfee, Halter & Griswold LLP

(57) ABSTRACT

An true time delay in optical signals using a Fourier cell is provided. One embodiment includes: an input array for inputting an array of light beams; at least a portion of a lens; a plurality of micromirrors located at a distance away from the lens that is approximately equal to the focal length of the lens; one or more mirrors located at a distance away from the lens that is approximately equal to the focal length of the lens; and one or more delay blocks, at least a portion of which are located at a distance away from the lens that is approximately equal to the focal length of the lens. The micromirrors may include a plurality of individually controllable pixels for directing one or more light beams in the array of light beams through the lens and onto either a mirror or a delay block.

17 Claims, 8 Drawing Sheets

U.S. PATENT DOCUMENTS

| | | |
|---|---|---|
| 5,319,477 A | 6/1994 | DeJule |
| 5,329,118 A | 7/1994 | Riza |
| 5,418,880 A | 5/1995 | Lewis et al. |
| 5,463,497 A | 10/1995 | Muraki et al. |
| 5,465,175 A | 11/1995 | Woodgate et al. |
| 5,475,525 A | 12/1995 | Tournois et al. |
| 5,512,907 A | 4/1996 | Riza |
| 5,592,333 A | 1/1997 | Lewis |
| 5,623,360 A | 4/1997 | Gesell et al. |
| 5,724,163 A | 3/1998 | David |
| 5,726,752 A | 3/1998 | Uno et al. |
| 5,767,956 A | 6/1998 | Yoshida |
| 5,852,693 A | 12/1998 | Jeong |
| 5,859,967 A | 1/1999 | Kaufeld et al. |
| 5,936,759 A | 8/1999 | Buttner |
| 5,973,727 A | 10/1999 | McGrew et al. |
| 6,014,244 A | 1/2000 | Chang |
| 6,040,880 A | 3/2000 | Tsuboi |
| 6,064,506 A | 5/2000 | Koops |
| 6,181,367 B1 | 1/2001 | McGrew et al. |
| 6,188,817 B1 | 2/2001 | Goodfellow |
| 6,236,506 B1 | 5/2001 | Cao |
| 6,266,176 B1 | 7/2001 | Anderson et al. |
| 6,323,981 B1 | 11/2001 | Jensen |
| 6,388,815 B1 | 5/2002 | Collins, Jr. et al. |
| 6,429,976 B1 | 8/2002 | Yamamoto et al. |
| 6,480,323 B1 | 11/2002 | Messner et al. |
| 6,522,404 B2 | 2/2003 | Mikes et al. |
| 6,525,889 B1 | 2/2003 | Collins, Jr. et al. |
| 6,535,340 B1 | 3/2003 | Saruwatari |
| 6,637,899 B2 | 10/2003 | Sunaga et al. |
| 6,647,164 B1 | 11/2003 | Weaver et al. |
| 6,674,939 B1 | 1/2004 | Anderson et al. |
| 6,711,316 B2 | 3/2004 | Ducellier |
| 6,724,535 B1 | 4/2004 | Clabburn |
| 6,724,951 B1 | 4/2004 | Anderson et al. |
| 6,734,955 B2 | 5/2004 | Wight et al. |
| 6,760,140 B1 | 7/2004 | Argueta-Diaz et al. |
| 6,816,307 B1 | 11/2004 | Sun |
| 6,922,277 B2 | 7/2005 | Moon et al. |
| 6,934,069 B2 | 8/2005 | Moon et al. |
| 6,952,306 B1 | 10/2005 | Anderson |
| 6,958,861 B1 | 10/2005 | Argueta-Diaz |
| 7,171,068 B2 | 1/2007 | Bartlett et al. |
| 7,215,474 B2 | 5/2007 | Argueta-Diaz |
| 7,236,238 B1 | 6/2007 | Durresi et al. |
| 2002/0030814 A1 | 3/2002 | Mikes et al. |
| 2003/0202731 A1 | 10/2003 | Ionov et al. |
| 2004/0190823 A1 | 9/2004 | Leuthold et al. |
| 2005/0007668 A1 | 1/2005 | Serati et al. |
| 2006/0034567 A1 | 2/2006 | Anderson et al. |
| 2006/0044987 A1 | 3/2006 | Anderson et al. |
| 2006/0061893 A1 | 3/2006 | Anderson et al. |
| 2006/0062517 A1 | 3/2006 | Anderson et al. |
| 2006/0114568 A1 | 6/2006 | Argueta-Diaz |
| 2007/0263958 A1 | 11/2007 | Anderson et al. |

FOREIGN PATENT DOCUMENTS

| | | |
|---|---|---|
| WO | WO 01/14924 A1 | 3/2001 |
| WO | WO 02/29436 A1 | 4/2002 |
| WO | WO 03/075048 A2 | 9/2003 |
| WO | WO 03/083521 A2 | 10/2003 |
| WO | WO 03/083541 A2 | 10/2003 |

OTHER PUBLICATIONS

U.S. Appl. No. 11/184,535, Final Office Action, mailed Oct. 15, 2007.

U.S. Appl. No. 10/726,771, Durresi et al.

Anderson, et al., Increasing Efficiency of Optical Beam Steerers, Draft Technical Report #3 for Harris Corporation, The Ohio State University, May 30, 2003, pp. 1-11.

Anderson et al., Binary-Counting True Time Delay Generator Using a White Cell Design and Deformable Mirror Devices, LEOS, Orlando, FL, Dec. 1998, 2 pgs.

Anderson et al., Design Advances in Free-Space Optical True-Time Delay Device, PSAA-8, Monterey, CA, Jan. 1998, 3 pgs.

Anderson et al., Highly Parallel Optical Device to Produce True Time Delays for Phased Array Antennas, Allerton, Sep. 1998, 14 pgs.

Anderson et al., Optically Produced True-Time Delays for Phased Antenna Arrays, Applied Optics, vol. 36, No. 32, Nov. 20, 1997, pp. 8493-8503.

Anderson et al., Optical Cross-Connect Based on Tip/Tilt Micromirrors in a White Cell, IEEE Journal of Selected Topics in Quantum Electronics, vol. 9, No. 2, Mar./Apr. 2003, pp. 579-593.

Anderson, et al. Optical Interconnection Device Based on the White Cell, presentation at Notre Dame University Nov. 6, 2002, 46 pgs.

Anderson, Optical Interconnections, Optical True-Time Delays, and More.., presentation at University of Colorado Jan. 28, 2003, 61 pgs.

Anderson et al., Steering of Optical Beams Using True-Time Delay Based on the White Cell, Optical Society of America, 2005, 4 pgs.

Anderson, et al., Polynomial-based optical true-time delay devices with microelectromechanical mirror arrays, Applied Optics, vol. 41, No. 26, Sep. 10, 2002, pp. 5449-5461.

Argueta-Diaz et al., Binary Optical Interconnection: Patent Disclosure Addendum, Mar. 7, 2005, pp. 1-47.

Argueta-Diaz, et al., Optical Cross-Connect System Based on the White Cell and 3-State MEMS: Experimental Demonstration of the Quartic Cell, accepted by Applied Optics Jan. 2006, pp. 1-11.

Argueta-Diaz, et al. Reconfigurable Photonic Switch Based on a Binary System Using the White Cell and Micromirror Arrays, IEEE Journal of Selected Topics in Quantum Electronics, vol. 9, No. 2, Mar./Apr. 2003, pp. 594-602.

Chen et al., 1-to-12 Surface Normal Three-Dimensional Optical Interconnects, Applied Physics Letters 63(14), Oct. 4, 1993, pp. 1883-1885.

Cohen et al., Optically Controlled Serially Fed Phased Array Sensor, IEEE Photonics Technology Letters, vol. 8, No. 12, Dec. 1996, pp. 1683-1685.

Collins et al., Numerical Optical Data Processing, Proceedings of the 1978 International Optical Computing Conference, London, England, Sep. 1978, pp. 194-197.

Collins et al., Optics for Numerical Calculations, Proceedings of ICO-11 Conference, Madrid, Spain, 1978, pp. 311-314.

Collins, Jr. et al., Optical True Time Delay for Phased Array Antennas Based on the White Cell, GOMAC, Monterey, CA, Mar. 1999, 4 pgs.

Collins, Numerical Optical Data Processor, SPIE, vol. 128, Effective Utilization of Optics in Radar Systems, 1977, pp. 313-319.

Ewing et al., Advancements in LCoS Optical Phased Array Technology, SPIE Great Lakes Regional Symposium, Cleveland, OH, Jun. 7, 2004, pp. 1-23.

Fairley et al., The Microphotonics Revolution, Mit's Magazine of Innovation, Technology Review, Jul./Aug. 2000, pp. 38-44.

Freitag et al., A Coherent Optically Controlled Phased Array Antenna System, IEEE Microwave and Guided Wave Letters, vol. 3, No. 9, Sep. 1993, pp. 293-295.

Goutzoulis et al., Hybrid Electronic Fiber Optic Wavelength-Multiplexed System for True Time-Delay Steering of Phased Array Antennas, Optical Engineering, vol. 31, No. 11, Nov. 1992, pp. 2312-2322.

Higgins et al., Design and demonstration of a switching engine for a binary true-time-delay device that uses a White cell, Applied Optics, vol. 42, No. 23, Aug. 10, 2003, pp. 4747-4757.

Kunathikom, et al. Design of Delay Elements in Binary Optical True-Time Delay Device that uses a White Cell, Applied Optics, vol. 42, No. 35, Dec. 10, 2003, pp. 6984-6994.

Li et al., Angular Limitations of Polymer-Based Waveguide Holograms for 1-to-many V-shaped Surface-Normal Optical Interconnects, Applied Physics Letters 65(9), Aug. 29, 1994, pp. 1070-1072.

Liu et al., Cascaded Energy-Optimized Linear Volume Hologram Array for 1-to-many Surface-Normal Even Fan-Outs, Optics and Laser Technology, vol. 29, No. 6, 1997, pp. 321-325.

Mital, et al., Design and Demonstration of an Optical True-Time-Delay Device Based on an Octic-Style White Cell, Journal of Lightwave Technology, vol. 24, No. 2, Feb. 2006, pp. 982-990.

Rader, et al., Demonstration of a Linear Optical True-time Delay Device by Use of a Microelectromechanical Mirror Array, Applied Optics, vol. 42, No. 8, Mar. 10, 2003, pp. 1409-1416.

Saleh et al., Fundamentals of Photonics, Wiley, Aug. 1991.

White, Long Optical Paths of Large Aperture, Journal Optical Society America, vol. 32, May 1942, pp. 285-288.
White, Very Long Optical Paths in Air, Journal Optical Society America, vol. 66, No. 5, May 1976, pp. 411-416.
Yen et al., Operation of a Numerical Optical Data Processor, 1980, SPIE vol. 232, International Optical Computing Conference, 1980, pp. 160-167.
Amendment from U.S. Appl. No. 11/182,111 dated Mar. 3, 2009.
Final Office action U.S. Appl. No. 11/184,536 dated Dec. 8, 2008.
Office action from U.S. Appl. No. 11/801,105 dated Nov. 3, 2008.
Response to Office action from U.S. Appl. No. 11/801,105 dated Jul. 16, 2008.
Amendment from U.S. Appl. No. 11/184,536 dated Aug. 1, 2008.
U.S. Appl. No. 11/184,535, Notice of Allowance and Fee(s) Due and Notice of Allowability with Examiner's Statement of Reasons for Allowance, mailed Jan. 31, 2008, 6 pages.
U.S. Appl. No. 11/184,536, Non-final Office Action, mailed May 1, 2008, 9 pages.
U.S. Appl. No. 11/801,105, Non-final Office Action, mailed Apr. 29, 2008, 9 pages.
Chiou et al., A Mirror Device with Tilt and Piston Motions, Oct. 1999, SPIE, vol. 3893, pp. 298-303.
U.S. Appl. No. 09/645,136, Non-final Office Action, mailed Aug. 15, 2001.
U.S. Appl. No. 09/645,136, Notice of Allowance and Fee(s) Due and Notice of Allowability with Examiner's Statement of Reasons for Allowance, mailed Feb. 26, 2002.
U.S. Appl. No. 09/688,478, Non-final Office Action, mailed Jan. 20, 2002.
U.S. Appl. No. 09/688,478, Notice of Allowance and Fee(s) Due and Notice of Allowability with Examiner's Statement of Reasons for Allowance, mailed Jul. 2, 2002.
U.S. Appl. No. 09/688,904, Notice of Allowance and Issue Fee Due and Notice of Allowability with Examiner's Amendment and Examiner's Statement of Reasons for Allowance, mailed Jan. 1, 2001.
U.S. Appl. No. 10/086,355, Non-final Office Action, mailed Feb. 2, 2003.
U.S. Appl. No. 10/086,355, Non-final Office Action, mailed Aug. 13, 2003.
U.S. Appl. No. 10/086,355, Notice of Allowance and Fee(s) Due and Notice of Allowability with Examiner's Amendment, Examiner's Statement of Reasons for Allowance, and Interview Summary, mailed Feb. 18, 2004.
Int'l App. No. PCT/US03/06189, International Search Report, mailed Oct. 20, 2003.
U.S. Appl. No. 10/106,177, Notice of Allowance and Fee(s) Due and Notice of Allowability with Examiner's Statement of Reasons for Allowance, mailed Jun. 12, 2003.
Int'l App. No. PCT/US03/09246, International Search Report, mailed Sep. 4, 2003.
Int'l App. No. PCT/US03/09246, International Preliminary Examination Report, completed Dec. 11, 2003.
U.S. Appl. No. 10/106,776, Non-final Office Action, mailed Jun. 10, 2003.
U.S. Appl. No. 10/106,776, Final Office Action, mailed Nov. 21, 2003.
U.S. Appl. No. 10/106,776, Notice of Allowance and Fee(s) Due and Notice of Allowability, mailed Dec. 11, 2003.
Int'l App. No. PCT/US03/09242, International Search Report, mailed Sep. 23, 2003.
Int'l App. No. PCT/US03/09242, International Preliminary Examination Report, completed Sep. 8, 2004.
U.S. Appl. No. 10/726,770, Non-final Office Action, mailed Aug. 20, 2004.
U.S. Appl. No. 10/726,770, Notice of Allowance and Fee(s) Due and Notice of Allowability with Examiner's Amendment, Examiner's Statement of Reasons for Allowance, and Interview Summary, mailed May 5, 2005.
U.S. Appl. No. 10/726,771, Non-final Office Action, mailed Jan. 1, 2005.
U.S. Appl. No. 10/726,771, Final Office Action, mailed Oct. 6, 2005.
U.S. Appl. No. 10/726,771, Non-final Office Action, mailed Jan. 30, 2006.
U.S. Appl. No. 10/726,771, Notice of Allowance and Fee(s) Due and Notice of Allowability with Examiner's Statement of Reasons for Allowance and Interview Summary, mailed Sep. 12, 2006.
U.S. Appl. No. 10/726,771, Notice of Allowance and Fee(s) Due and Notice of Allowability with Examiner's Statement of Reasons for Allowance, mailed Feb. 28, 2007.
U.S. Appl. No. 10/727,009, Notice of Allowance and Fee(s) Due and Notice of Allowability with Examiner's Statement of Reasons for Allowance, mailed Dec. 7, 2004.
U.S. Appl. No. 10/727,009, Notice of Allowance and Fee(s) Due and Notice of Allowability with Examiner's Statement of Reasons for Allowance, mailed May 24, 2005.
U.S. Appl. No. 11/184,535, Non-final Office Action, mailed Oct. 10, 2006.
U.S. Appl. No. 11/184,535, Non-final Office Action, mailed Apr. 3, 2007.
U.S. Appl. No. 11/183,029, Non-final Office Action, mailed Nov. 20, 2006.
U.S. Appl. No. 11/256,578, Non-final Office Action, mailed Mar. 29, 2006.
U.S. Appl. No. 10/256,578, Notice of Allowance and Fee(s) Due and Notice of Allowability with Examiner's Statement of Reasons for Allowance, mailed Aug. 17, 2006.
U.S. Appl. No. 10/256,578, Notice of Allowance and Fee(s) Due and Notice of Allowability with Examiner's Statement of Reasons for Allowance, mailed Dec. 6, 2006.
Collins et al., An Experimental Numerical Optical Processor (NOP), Digest of Papers for Compcon 78, IEEE catalog No. 78CH1328-4C, San Francisco, CA, Feb. 28-Mar. 3, 1978, pp. 198-199.
Collins, Jr., The Design of Devices for Producing Optically Controlled Incremental Time Delays for Phased Array Radars, National Reconnaissance Office, Contract No. NRO-98-C-6002, Technical Report 736076-1, The Ohio State University, Oct. 1998, 60 pages.
Collins, Jr. et al., True Time Delay with Binary Time Delay for Large Arrays, 1998 Antenna Applications Symposium, Allerton Park, Monticello, IL, Sep. 1998, 13 pages.
Dolphi et al., Experimental Demonstration of a Phased-Array Antenna Optically Controlled with Phase and Time Delays, Applied Optics, vol. 35, No. 26, Sep. 10, 1006, pp. 5293-5300.
Int'l App. No. PCT/US00/23361, International Search Report, mailed Jan. 8, 2001.
Int'l App. No. PCT/US00/23361, International Preliminary Examination Report, completed May 8, 2001.
EP App. No. 00 96 1366, Supplementary European Search Report, completed Apr. 3, 2003.
Bishop et al., The Rise of Optical Switching, Scientific American, Jan. 2001, pp. 88-94.
Hect, Many Approaches Taken for All-Optical Switching, Laser Focus World, www.optoelectronics-world.com, Aug. 2001, 5 pgs.
Webb et al., Stroke Amplifier for Deformable Mirrors, Applied Optics, vol. 43, No. 28, Oct. 1, 2004, pp. 5330-5333.
Zdeblick, Design Variables Prevent a Single Industry Standard, Laser Focus World, www.optoelectronics-world.com, Mar. 2001, 4 pgs.
U.S. Appl. No. 11/182,111, Final Office Action, mailed Sep. 3, 2008, 16 pages.

US 7,911,671 B2

APPARATUS AND METHOD FOR PROVIDING TRUE TIME DELAY IN OPTICAL SIGNALS USING A FOURIER CELL

RELATED APPLICATIONS

This application claims all of the benefits of, and priority to, U.S. Provisional Application Ser. No. 60/799,285, filed: May 10, 2006. Application Ser. No. 60/799,285 is titled Apparatus and Method For Providing True Time Delay in Optical Signals Using Spherical Fourier Cell and is incorporated herein in its entirety.

FIELD

The invention generally relates to an optical true time delay (TTD) device. One exemplary embodiment utilizes a spherical Fourier cell. In one application, an optical TTD device may be used to provide TTDs for one or more individual optical signals within a plurality (e.g., matrix) or array of optical signals. However, additional applications of the apparatus and method are also possible and contemplated.

BACKGROUND

Devices that produce optical TTDs can be used for the steering of radar phased arrays, transversal filtering, and other optical signal processing applications. Electronically implementing TTDs is generally impractical because such implementation requires long lengths of strip lines, waveguides, or coaxial cable, which are expensive, bulky, and temperature sensitive. Because long paths are comparatively easy to obtain optically, photonic systems provide a means of obtaining a combination of the beam agility of array systems and wide bandwidth. Approaches to TTD devices tend to fall into two categories: those using fibers and those using long free-space paths. Some fiber approaches use multiple optical switches or broadcast the light over multiple possible paths at once. In addition, wavelength-division-multiplexing schemes have recently been developed by use of fiber Bragg gratings.

Free-space systems have used multiple optical switches for switching the beams between sequential optical paths. These optical switches are usually liquid-crystal based. Another type of free-space system includes a TTD device that uses a multiple-pass optical cell with refocusing mirrors.

SUMMARY

An optical TTD device that is based on a Fourier-optic arrangement is provided. One embodiment provides an apparatus for introducing a true time delay in optical signals which includes: an input array for inputting an array of light beams; at least a portion of a lens; a plurality of micromirrors located at a distance away from the lens that is approximately equal to the focal length of the lens; and one or more mirrors located at a distance away from the lens that is approximately equal to the focal length of the lens. In addition, the embodiment includes: one or more delay blocks, at least a portion of which are located at a distance away from the lens that is approximately equal to the focal length of the lens. In one embodiment, the micromirrors include a plurality of controllable elements for directing one or more light beams in the array of light beams through the lens and onto either a mirror or a delay block. A set of input beams are repeatedly Fourier-transformed and inverse-transformed to obtain a TTD. In the Fourier transform plane, time delays are introduced.

DETAILED DESCRIPTION

In one exemplary embodiment, the proposed system provides a TTD device for an input array of light beams and independently controls the amount of delay each light beam receives relative to a given bias delay for the system. This exemplary system has applications for phased array radars where beam steering can be done by delaying signals going to the different antenna elements by various amounts relative to one another. By implementing TTD, as opposed to phase shifting, the usable bandwidth is greatly increased.

Properties of an optical Fourier transform and its effects when considering light as rays and as Gaussian beams are provided herein. A spherical lens and corresponding equations showing how to use the spherical lens for a Fourier transform is also provided. In general, light beams pass through this spherical lens multiple times in a specific pattern. In various embodiments, mirrors are set up around the sphere to provide a desired bounce pattern. Additionally, in several exemplary embodiments, a two-dimensional fiber array at the input and microelectromechanical system (MEMS) chips are provided at subsequent image planes. At the Fourier transform planes, mirrors having two sections—one a flat mirror and the other a delay device, such as, for example, a block, a lens train or a mirror train that has a delay associated therewith—are provided. MEMS pixels may be used to control whether a light beam is delayed or whether the light beam is directed to the flat mirror, which is a bias (null) delay mirror.

Figure 1:
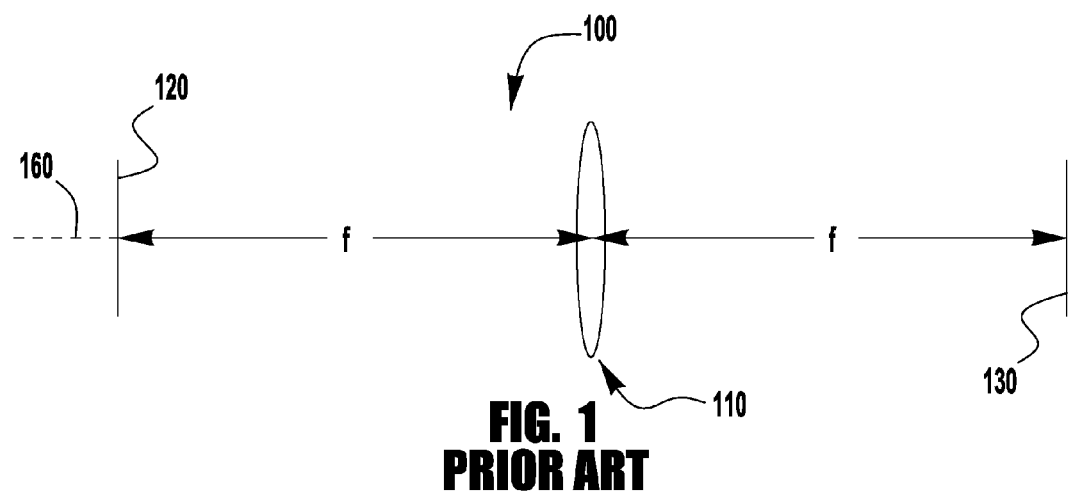
FIG. 1 is a diagram of an exemplary prior art optical Fourier transform setup using a thin lens.

An optical Fourier transform 100 is shown in FIG. 1. This transform uses a thin lens approximation. The lens 110 has a focal length f, and is separated by a distance f from the object plane 120 along the optical axis 160 of the lens 110. The Fourier transform 130 is located a distanced f along the optical axis 160 on the opposite side of the lens 110.

When looking at this transform as it affects light beams there are three main principals: i) first, for a thin lens approximation, light beams passing through the center are not refracted, ii) second, light beams diverging from a point source at one of the focal planes (the object plane 120 or Fourier transform plane 130) are parallel after passing through the lens 110, and iii) third, parallel rays passing through the lens converge on a point in one of the focal planes.

Figure 2:
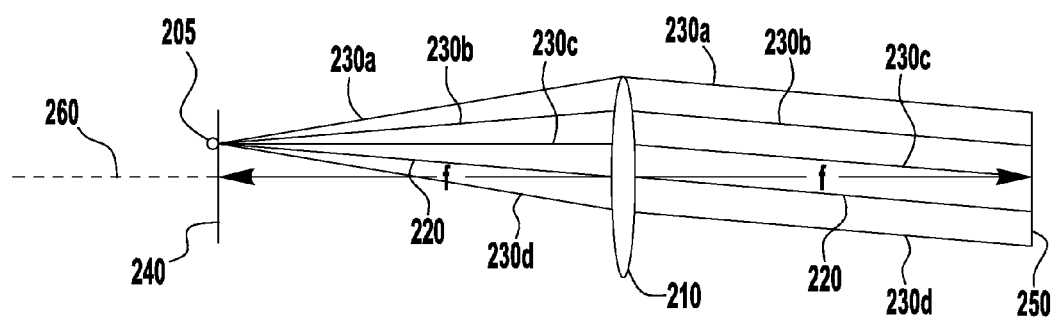
FIG. 2 is a diagram of an exemplary prior art optical Fourier transform setup using a thin lens with a point source at the object plane.

With reference to FIG. 2, we see the same setup as FIG. 1 with a point source 205 at the object plane 240. Light rays 230a, 230b, 230c and 230d passing through the lens 210 are collimated parallel to light rays 220 which passed through the center of the lens 210, and whose angle is unchanged by the lens 210.

Figure 3:
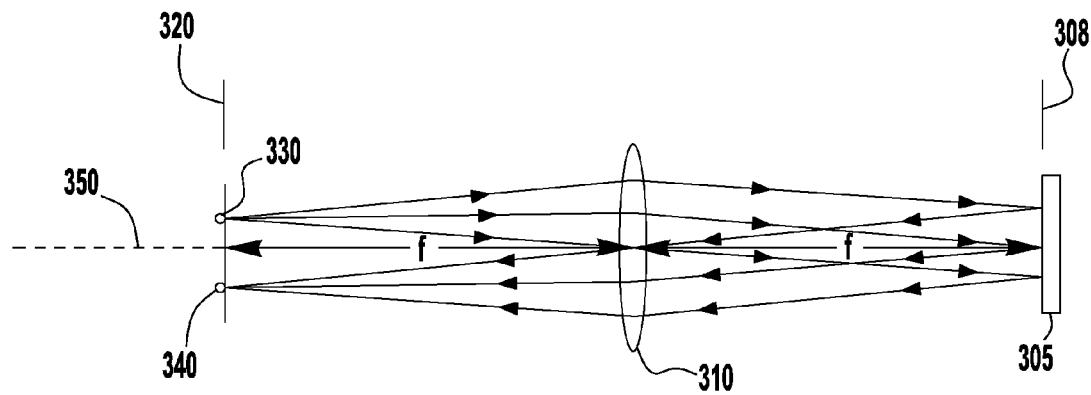
FIG. 3 is a diagram of an exemplary prior art optical Fourier transform setup using a thin lens, a point source at the object plane, and a flat mirror at the Fourier transform location to produce an inverse transform image at the object plane.

If a flat mirror 305 (FIG. 3) is placed at the location of the Fourier transform plane 308, the light is reflected back through the lens 310 and the Fourier transform of the transform is located at the original object plane 320. The result is the image 340 of the object 330 at the object plane 320 located at a point 340 on the opposite side of the optical axis 350.

Figure 4:
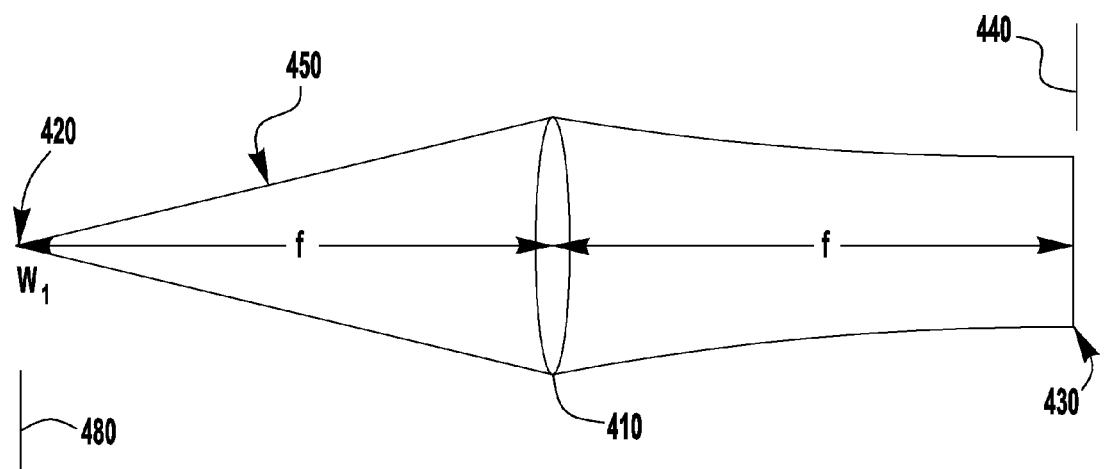
FIG. 4 is a diagram of an exemplary prior art optical Fourier transform setup using a thin lens with a Gaussian beam source at the object plane.

In certain exemplary implementations, light beams coming out of fibers, which closely match Gaussian profiles may be used. The Fourier transform of a Gaussian light beam 450 at its waist is another Gaussian beam at its waist. This situation is depicted in FIG. 4. The radius of the Gaussian input light beam 450 input spot 420 is $w_1$ and the radius of the output beam or output spot 430 is $w_2$.

The relationship between the input spot 420 radius and the output spot 430 radius can be found for a particular focal length, f, and the wavelength of the light, $\lambda$. The relationship is shown in equation (1).

$$w_2(\text{output\_spot\_radius}) = \frac{\lambda f}{\pi w_1} \quad (1)$$

If a flat mirror (not shown) is placed at the transform plane 430 the light beam comes to a waist again at the object plane 480 with the same radius $w_1$ as the input spot 420. Both light beams and Gaussian light beams are imaged back at the object plane 480 with magnification −1. Since the system is symmetric about the lens 410, the same could be said if the beam originated at the transform plane 430 and there were a mirror (not shown) at the object plane 480.

FIGS. 5 through 17 illustrate various exemplary embodiments, applications, and aspects for the present invention. For example, these figures illustrate an apparatus for introducing a true time delay in optical signals that includes: an input array for inputting an array of light beams; at least a portion of a lens; a plurality of micromirrors located at a distance away from the lens that is approximately equal to the focal length of the lens; one or more mirrors located at a distance away from the lens that is approximately equal to the focal length of the lens; and one or more delay blocks, at least a portion of which are located at a distance away from the lens that is approximately equal to the focal length of the lens. In one embodiment, the micromirrors may include a plurality of controllable elements for directing one or more light beams in the array of light beams through the lens and onto either a mirror or a delay block.

Another exemplary apparatus for introducing a true time delay in optical signals using a Fourier cell is disclosed and includes: an input array for inputting an array of light beams; at least a portion of a lens; a plurality of micromirrors located at a distance away from at least a portion of a lens that is approximately equal to the focal length of the lens; one or more mirrors located at a distance away from the at least a portion of a lens that is approximately equal to the focal length of at least a portion of a lens. In one embodiment, the one or more mirrors are aligned to induce a delay in the light beam signal by folding one or more light beams back into the Fourier cell.

An exemplary method for introducing a true time delay into an optical signal is also illustrated, which includes: bouncing an array of light beams off of a first micromirror; adjusting one or more pixels on the micromirror so that light beams incident on the one or more pixels are directed through at least a portion of a lens onto a first mirror or a first delay block having a first set delay; bouncing at least a portion of the light beams off of a second micromirror; adjusting one or more pixels on the second micromirror so that light beams incident on the one or more pixels are directed through at least a portion of the lens onto a second mirror or second delay block having a second set delay; and repeating any of the previous steps until the desired delay has been introduced into the optical signal.

Still yet, exemplary embodiments include a true time delay device for an optical signal using a Fourier cell that include: means for bouncing an array of light beams off of a first micromirror; means for adjusting one or more pixels on the micromirror so that light beams incident on the one or more pixels are directed through at least a portion of a lens onto a first mirror or a first delay block having a first set delay; means for bouncing the array of light beams off of a second micromirror; and means for adjusting one or more pixels on the second micromirror so that light beams incident on the one or more pixels are directed through at least a portion of the lens onto a second mirror or second delay block having a second set delay.

Figure 5:
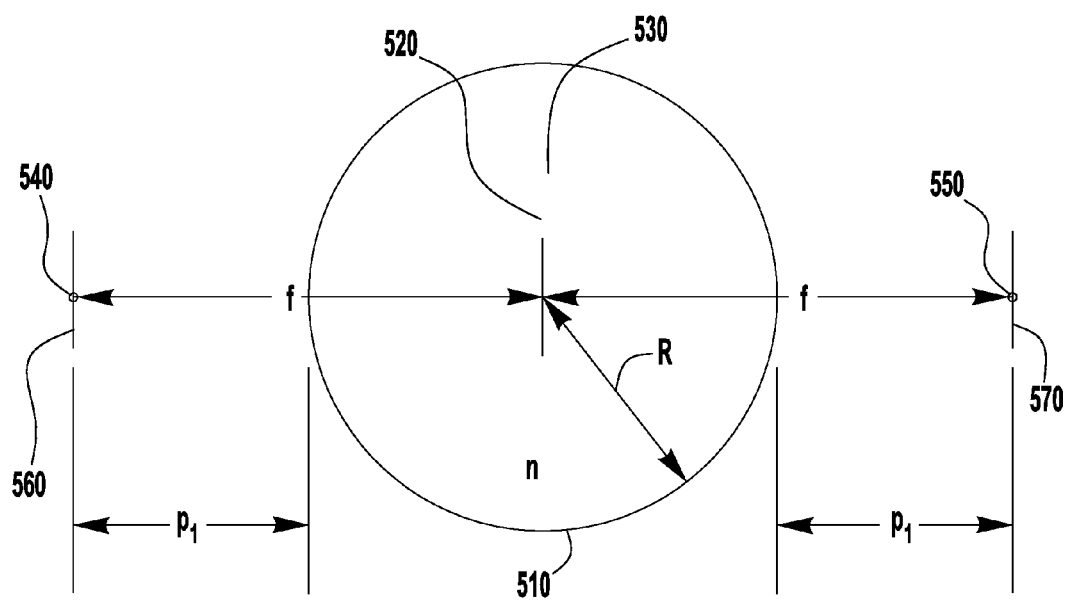
FIG. 5 is a diagram of an exemplary Fourier cell using a spherical lens according to one embodiment of the present invention.

In some exemplary embodiments, a spherical lens or a portion thereof may be used. FIG. 5 illustrates the use of a spherical lens 510 rather than a thin lens 410. To use the thin lens approximations the front and back principal planes 520, 530 respectively of the sphere lens 510 need to be found. The principle planes 520, 530 may be found using system matrices. The system matrix for a spherical lens consists of refraction at the surface on either side of the spherical lens along with a translation between the surfaces, which is equal to the sphere's diameter, shown in equation 2. This equation assumes free space around the spherical lens 510, a refractive index, n, inside the sphere, and that the spherical lens 510 has a radius, R.

$$\begin{bmatrix} A & B \\ C & D \end{bmatrix} = \begin{bmatrix} 1 & 0 \\ (1-n)/R & 1 \end{bmatrix} \begin{bmatrix} 1 & 2R/n \\ 0 & 1 \end{bmatrix} \begin{bmatrix} 1 & 0 \\ (1-n)/R & 1 \end{bmatrix} \quad (2)$$

$$= \begin{bmatrix} (2-n)/n & 2R/n \\ 2(1-n)/nR & (2-n)/n \end{bmatrix}$$

Using this system matrix, the principal planes 520, 530 can be found. Equations (3) and (4) provide their locations, where $p_1$ is the distance in front of the spherical lens 510 to the front principal plane 520 and $p_2$ is the distance from the back of the spherical lens 510 to the back principal plane 530. Additionally, the dimensions $p_1$ and $p_2$ are shown in FIGS. (3) and (4).

$$p_1 = \frac{1-D}{C} = \frac{1-(2-n)/n}{2(1-n)/nR} = -R \quad (3)$$

$$p_2 = \frac{1-A}{C} = \frac{1-(2-n)/n}{2(1-n)/nR} = -R \quad (4)$$

Based on equations (3) and (4), the front and back principal planes 520, 530 are a distance R inside the spherical lens 510, meaning they are both at the center. If an input 540 is located at a distanced from the front principal plane 520, the Fourier transform 530 can be found a distance f from the back principal plane 530, where f is the focal length of the spherical lens 510.

The focal length of the spherical lens 510 can be calculated using equation (5) below.

$$f = -\frac{1}{C} = \frac{nR}{2(1-n)} = \frac{nR}{2(n-1)} \quad (5)$$

The focal planes, i.e., the object plane 560 and the Fourier transform plane 570, should be outside of the spherical lens 510 (f>R) and thus, the focal length should not be negative. Assuming free space around the sphere lens 510, the refractive index, n, of the sphere lens may be between 1 and 2. Typical flat lenses have a single optical axis that is normal to the front and back surfaces; a spherical lens has an infinite number of axes going through the center that are normal to both surfaces. Along any of these axes, the principal planes 520, 530 are in the center of the spherical lens 510 with focal planes 560, 570 a distance, f from the center on either side of the sphere lens 510.

Figure 6:
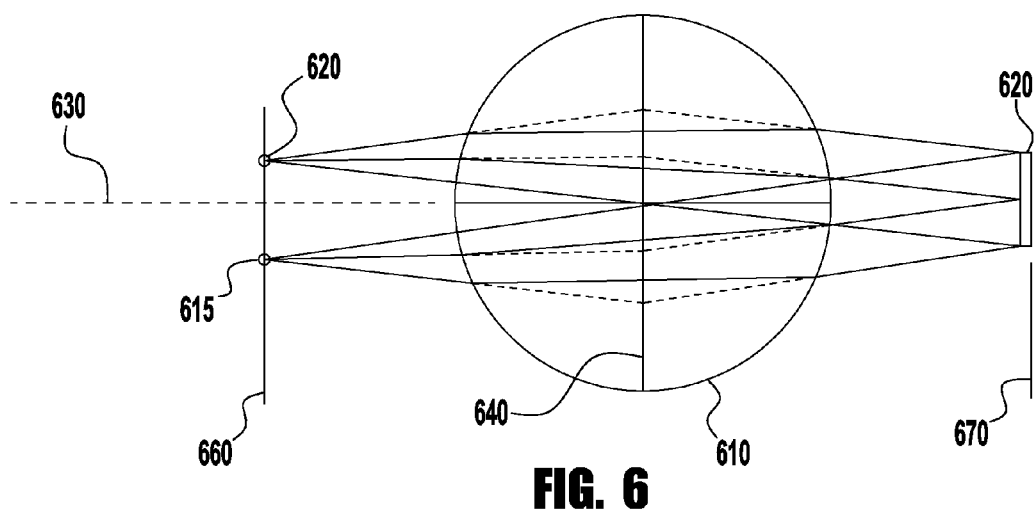
FIG. 6 is a diagram of an exemplary spherical Fourier cell with a point source at the object plane and a flat mirror at the Fourier transform location to produce an inverse transform image at the object plane.

FIG. 6 illustrates an exemplary embodiment of a spherical Fourier cell. A portion of a sphere may be used instead. Mirror 620 at the Fourier transform plane 670 normal to the optical axis 630 provides an image 620 on the opposite side of the optical axis 630 from the object 615. In the case of a spherical lens there are infinite possible optical axes; the optical axis that the object is imaged about is the one optical axis that is normal to the mirror 620 located at the transform plane 670.

In FIG. 6, solid lines indicate actual light beam paths through spherical lens 610 and dashed lines are light beam paths for a thin lens (not shown) located at the principal planes 640. Regardless of where the light beam is incident on the transform mirror 620 it is still imaged about the optical axis because the set of parallel light rays striking the plane 670 of the transform mirror 620 cross at a single point at the front focal plane (in a Fourier transform, lines that come in parallel converge on a point at the opposite focal plane).

Figure 7:
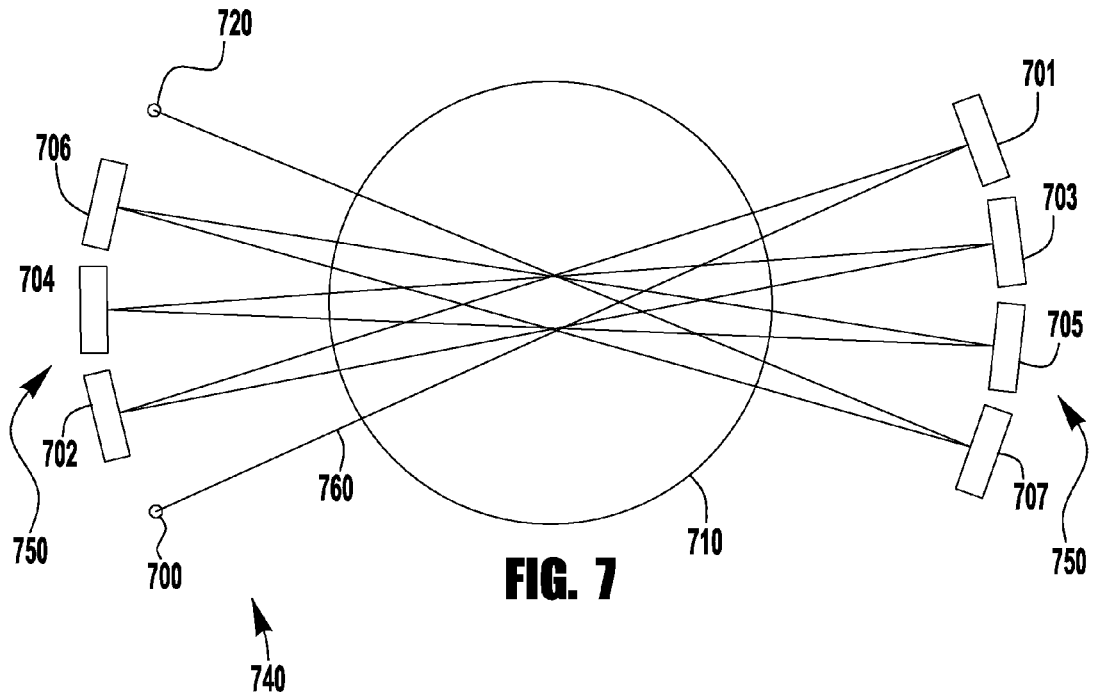
FIG. 7 is a diagram of an exemplary spherical Fourier cell with a point source input and seven flat mirrors arranged in relation to the spherical lens to produce a point source output via a bounce pattern through the spherical lens.

FIG. 7 provides another exemplary embodiment having mirror segments at both the transform and object planes (each at a focal distance from the center of the sphere), each with varying angles. A bounce pattern can be developed where a light beam is incident on each mirror once. In FIG. 7 a light beam 760 is present at the input 700 and directed so that its transform is centered on the mirror 701. Mirror segment 701 is aligned or tilted so that a line normal to mirror 701 falls between the input 700 and mirror 702, so the input 700 is imaged onto mirror 702. Similarly, mirror 702 has a normal such that mirror 701 is imaged onto mirror 703. This pattern continues with the light beam 760 bouncing on each numbered mirror 701 thru 706, in order until it reaches the output 720. The even-numbered mirrors 702, 704 and 706, as well as the output 720, are images of the input 700, and the odd-numbered mirrors 701, 703, 705 and 707 are transforms of the input 700 and are images of each other.

Figure 8:
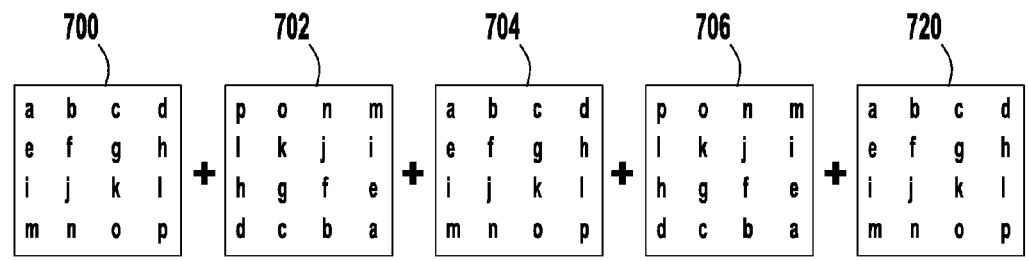
FIG. 8 shows a sequence of an array of beams looking from the center of a sphere toward the object space in an exemplary spherical Fourier cell for an input, mirrors, and an output.

Exemplary systems can be configured to handle several input light beams, coming in from a fiber array at the input. The array of input light beams may be parallel to each other. Considering only the center of each light beam we can use the light beams to describe how light beams propagate through the system. FIG. 8 is a view of the input 700, output 720 and even-numbered mirrors 702, 704 and 706 as viewed from the center of a spherical lens or portion thereof (not shown). The letters represent the centers of sixteen different beams a-p, located where they are imaged on each succeeding mirror. Obviously, the number of light beams is arbitrary. That is, there could be virtually any number of light beam inputs, within reason.

The light beams are at relatively the same distance from the Fourier mirror's normal as they were in FIG. 7. The beams a through p are incident on separate parts of the even-numbered mirrors 702, 704 and 706; that is, they are separate and distinct and do not overlap. In the Fourier planes (the odd-numbered mirrors 701, 703, 705 and 707 of FIG. 7), the centers of the light beams coincide or converge on the center of the mirrors 701, 703, 705 and 707.

Figure 9:
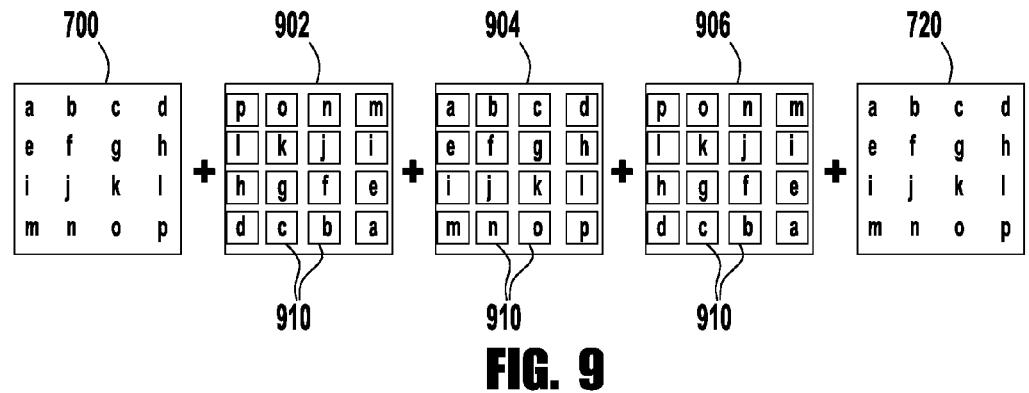
FIG. 9 shows a sequence of an array of beams looking from the center of a sphere toward the object space in an exemplary spherical Fourier cell at an input, MEMS mirror devices, and an output.

Flat mirror 702, 704 and 706 in the image planes, i.e., the planes where the light beams a-p are separate and distinct may be replaced with MEMS devices. A MEMS chip or device includes an array of micromirrors (e.g., pixels) that can tip to various angles responsive to a control signal. Other embodiments, having fixed, or permanently tipped micromirrors are also contemplated. Permanently tipped micromirrors may be used in, for example, signal processing and transversal filtering, where the delays are fixed. The arrangement and pitch of the array of pixels is selected to match the array of input light beams, such that each light beam is incident on the center of one of the micromirrors or pixels. This is illustrated in FIG. 9 where segments 902, 904 and 906 are MEMS device with pixels 910.

Just as the even numbered mirrors 702, 704 and 706, MEMS 902, 904, and 906 direct the light beams back through the spherical lens. The pixel tips 910 however, may independently change the destination of the Fourier transform for one or more particular light beams.

Figure 10:
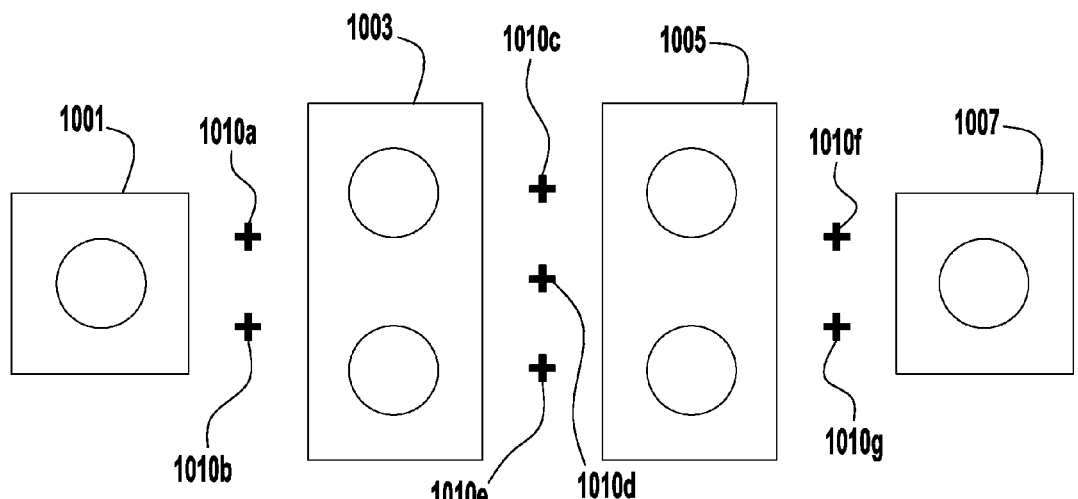
FIG. 10 shows a sequence of an array of coincident beams looking from the center of a sphere in an exemplary spherical Fourier cell at mirror devices in the Fourier transform space.

FIG. 10 illustrates exemplary transform mirrors as viewed from the center of the spherical lens or portion thereof (not shown); light beams coming in from the input array (not shown) overlap at mirror 1001. MEMS 902, 904 and 906

(FIG. 9) are MEMS chips with three possible pixel tip angles. The pixel tip angles allow any light beam's transform to be reproduced at either the top or the bottom of mirror 1003. Both sections of mirror 1003 have the same normal so the light beam at MEMS 904 is not affected by whether a light beam came from the top or bottom of mirror 1003. The MEMS pixels have three possible states or tip angles (−θ, 0, +θ).

A flat, or 0, tip angle may be used at, for example, MEMS 904 to reflect a light beam from the top of mirror 1003 to the bottom of mirror 1005 or alternatively from the bottom of mirror 1003 to the top of mirror 1005. A tip angle +θ may be used at, for example, MEMS 904 to direct a light beam to the top of mirror 1003 to the top of mirror 1005. A −θ tip angle may be used, for example, to direct a light beam from the bottom of mirror 1003 onto the bottom of mirror 1005.

Possible pixel normals 1010a through 1010g are shown in FIG. 10 for each segment 902 through 906. The circles indicate the locations of the Fourier transforms of the light beams. The light beam locations overlap on mirrors 1001 and 1007. However, the light beams can be incident on either of two locations for mirrors 1003 and 1005. That is, the Fourier transforms of some of the light beams coming from MEMS 902 may be coincident at the top of mirror 1003, and the Fourier transforms of other light beams coming from the MEMS 902 may be coincident at the bottom of mirror 1003. As previously mentioned, the Fourier transform of a Gaussian beam at its waist is another Gaussian beam, so at each location, the overlapping Gaussian beams are similarly centered about the same point. The Gaussian beams are at their waists at the MEMS pixels, but in separate locations.

Figure 11:
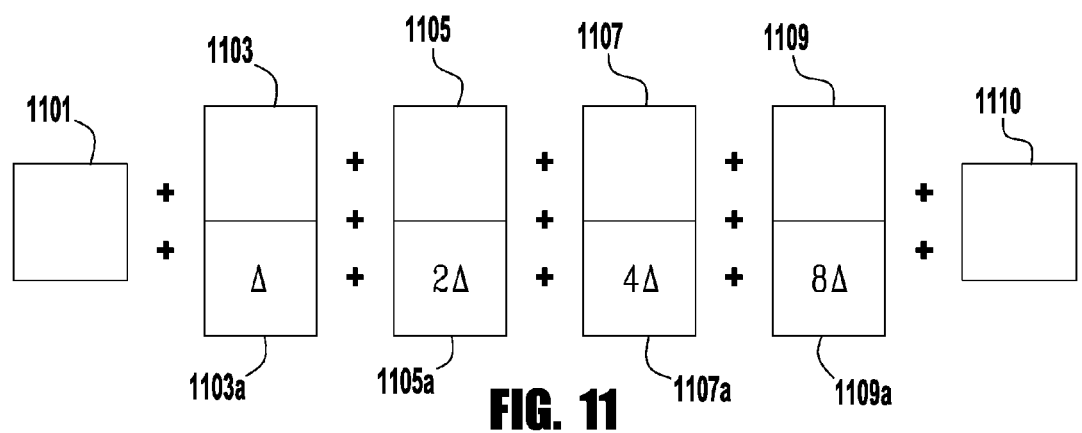
FIG. 11 shows a sequence of flat mirrors viewed from the center of a sphere in an exemplary spherical Fourier cell with the flat mirrors in four locations split into two sections comprising a plane mirror and a delay block mirror.

FIG. 11 illustrates an exemplary means to introduce delay into the system. The bottom halves of mirrors 1003 and 1005 are replaced by either glass blocks or lens trains (not shown) that have an optical effect consistent with the flat mirror, but have a longer transit time or a delay than the mirror. For example, let the minimum delay be Δ and let Δ be the delay of the first delay block, 1003a. To implement a binary sequence, the delay at the bottom of each subsequent delay block is equal to twice that of the previous delay block. For example, to delay a light beam an integer multiple Δ, between 0 and 15, the transform mirrors 1003, 1105, 1107, 1109 would look like those in FIGS. 11 and 12 where each subsequent block has a delay A of twice that of the proceeding delay block.

FIG. 11 shows the transform mirrors 1103, 1105, 1107, 1109 as seen from the center of the spherical lens (not shown) with the lower half of mirrors 1103, 1105, 1107, and 1109 replaced by dielectric blocks 1103a, 1105a, 1107a, 1109a that transmit light incident on the surface that is near the spherical lens and reflect light incident at the end of the block opposite the sphere. Each block 1103a, 1105a, 1107a and 1109a are labeled relative to the delay A difference between the dielectric block and the mirror above it. For example, dielectric block 1103a has a delay of Δ with respect to mirror segment 1103; dielectric block 1105a has a delay of 2 Δ with respect to mirror segment 1105; dielectric block 1107a has a delay of 4 Δ with respect to mirror segment 1007; and dielectric block 1109a has a delay or 8 Δ with respect to mirror segment 1109. Delay blocks, such as, for example, a dielectric block, a glass block, a lens trains, or other suitable delay blocks may be used.

Figure 12:
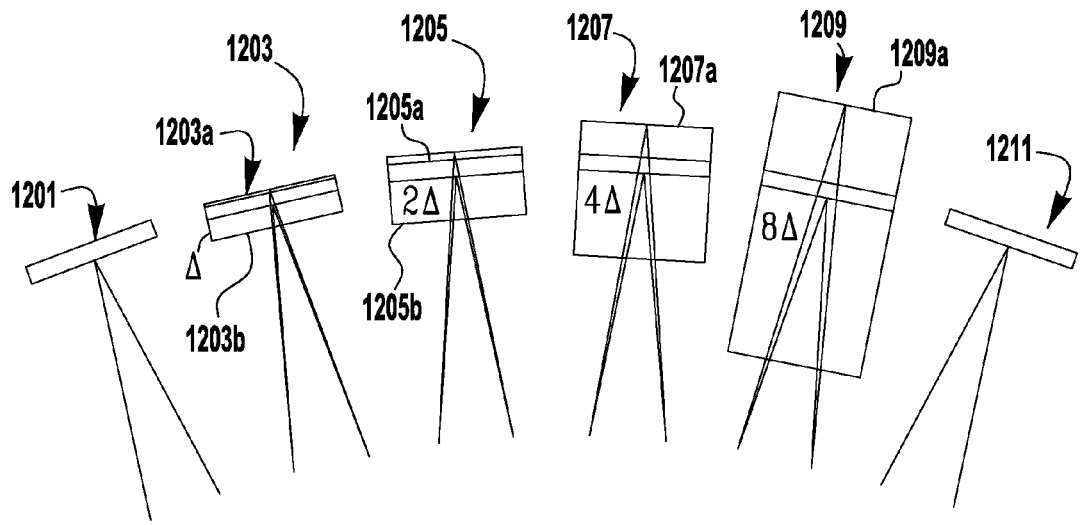
FIG. 12 is a top view of the flat mirrors of FIG. 11 comprised of plane mirror sections and delay block mirror sections.

FIG. 12 shows the top view of exemplary transform mirrors 1201, 1203, 1205, 1207, 1209 and 1211. At each segment 1203, 1205, 1207 and 1209 there is a top plane mirror 1203a, 1205a, 1207a and 1209a and below it a delay block 1203b, 1205b, 1207b and 1209b. The light beam paths going to the flat mirrors 1201, 1203, 1205, 1207, 1209 and 1211 are shown in solid lines and the light beams going into the delay blocks 1203a, 1205, 1207a and 1209a are shown in dashed lines. The delay blocks in this example are glass blocks. For longer delays, materials with higher refractive indices can be used for the delay blocks. Alternatively, lens trains can be used or the light beam or ray could be directed through a spherical lens or portion thereof some number of times before it is imaged onto the subsequent mirror.

If the desired delay is too long to be accomplished in a dielectric block, the delay may be accomplished by use of a lens train. In an effort to reduce space, longer delays may also be obtained by folding the beam or array through the spherical lens multiple times. It is also possible to provide delays through use of optics outside of the switching engine, or spherical Fourier cell.

Figure 13:
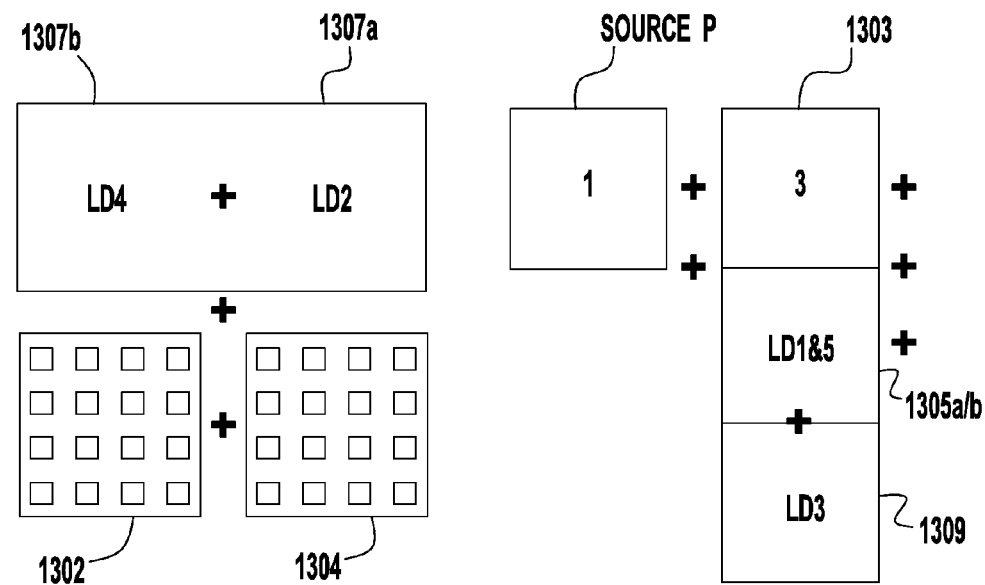
FIG. 13 shows a layout for a bounce progression as viewed from the center of a spherical lens in a spherical Fourier cell for a long delay where a beam is folded back into the spherical lens.
Figure 14:
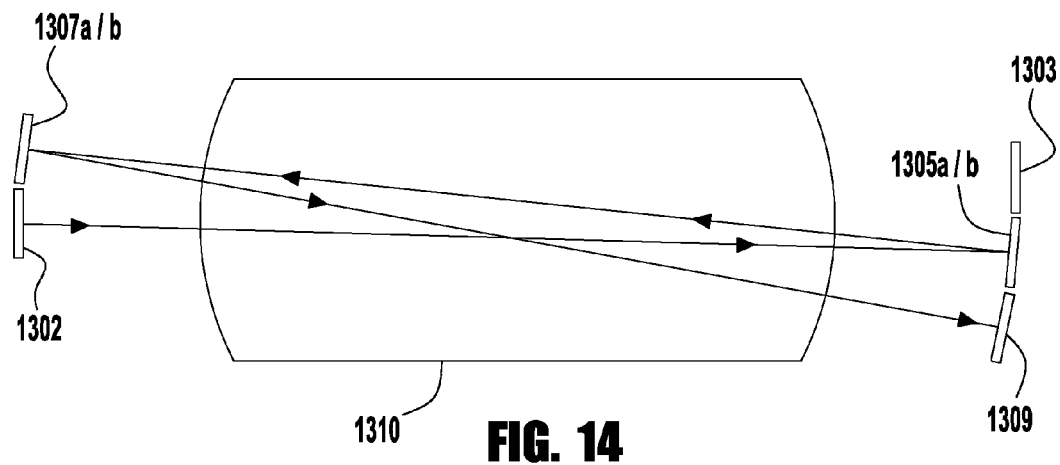
FIG. 14 is a side view of a bounce progression of the layout of FIG. 13 in a spherical Fourier cell for a long delay where a beam is folded back into the spherical lens.

Long desired delays can, for example, be obtained by folding the light beam back into the spherical lens. Folding the light beam back through the system generally refers to a bounce path that results in the light beam retracing at least a portion of its path. The folded light beam behaves optically in a manner consistent with the flat null cell mirror. This means that after each additional bounce, one MEMS segment is imaged with a −1 magnification onto the next MEMS segment. FIGS. 13 and 14 show the folding mirrors as viewed from the center of the spherical lens for one of these exemplary longer delays. FIG. 14 shows a side view for the exemplary embodiment of FIG. 13, which uses a portion of a spherical lens 1310.

If a delay is not desired the MEMS 1302 pixel is tipped so that the light beam is directed to mirror 1303 and then is imaged with a negative magnification onto MEMS 1304. If a delay is desired the MEMS 1302 pixel is tipped so that the light beam is directed to mirror 1305. Mirror 1305 has two segments, 1305a and 1305b. Mirror segment 1305a is a plain, flat mirror that has its normal so that the negative image of the beam on MEMS 1302 is incident on 1307a, which is also a flat two segment mirror. Mirror 1307a has a normal that causes the light beam from 1305a to be imaged onto mirror 1309. This much of the beam path is shown in FIG. 14. Then, the light beam retraces the path i.e. it is folded back into the system—mirror 1309 is inverse Fourier-transformed onto 1307b which is now the positive image of MEMS 1302. Mirror segments 1307a and 1307b are part of the same mirror, and have the same normal, so the light beam from mirror 1309 is imaged back onto 1305b. Mirror segment 1305b has a normal that images the light beam from 1307b onto MEMS 1304 via 1305a, which is now the negative image of MEMS 1302. This delay illustrates four additional round trips through the system, which would be a minimum delay, but any number of round trips such as 8, 12, 16, etc. are also possible with the use of additional mirrors. Since the delay is relative to the size of the lens, the size of the system may be changed for a specific delay.

Figure 15:
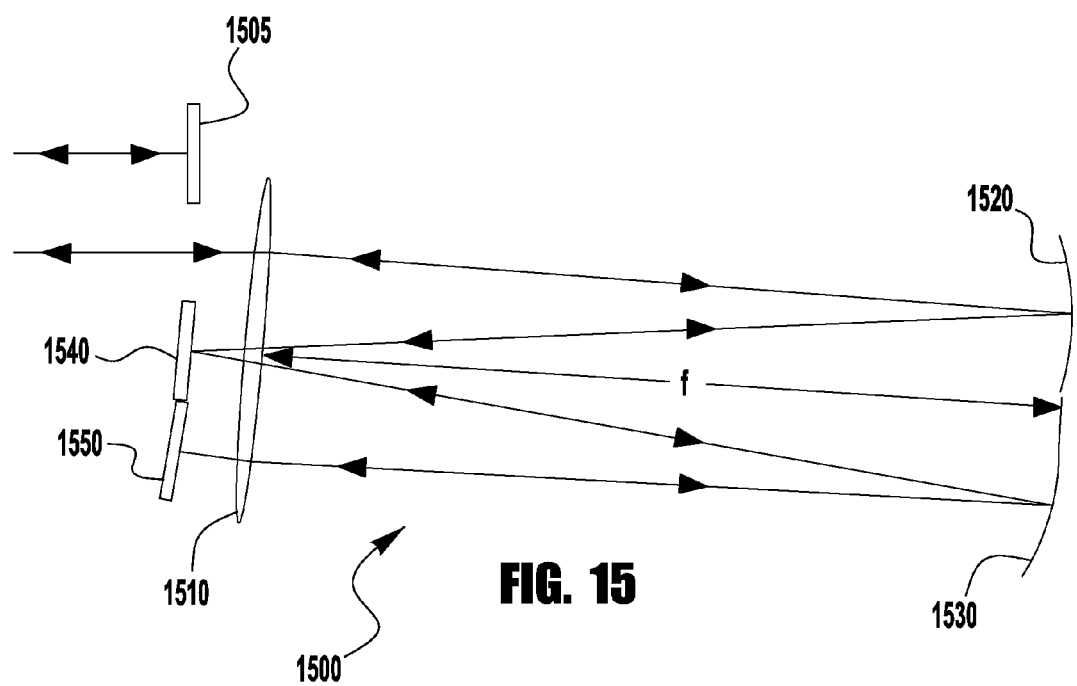
FIG. 15 is a side view of a bounce progression where a long delay is produced by passing the beam outside the spherical Fourier cell to a folded lens train.
Figure 16:
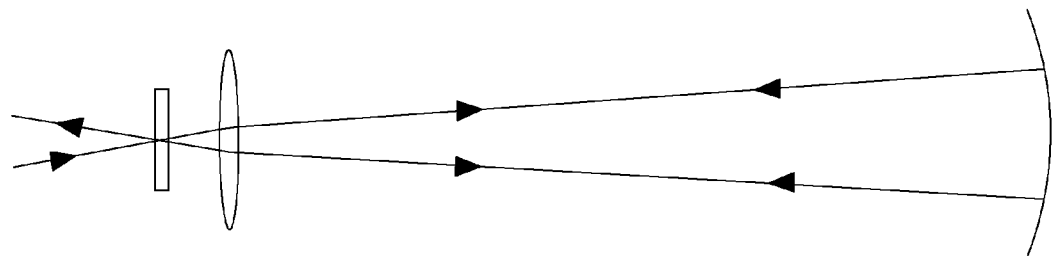
FIG. 16 is a top view of a bounce progression where a long delay is produced by passing the beam outside the spherical Fourier cell to a folded lens train.

For delays longer than those obtainable using glass blocks, but too short for using the folding light beam method, external folded lens trains may be used. One such exemplary lens train is illustrated in FIGS. 15 and 16. FIG. 15 is a side view and FIG. 16 is a top view. In this exemplary embodiment the beam is allowed to pass by the Fourier transform segments to an area the outside Fourier spherical cell system. This exemplary embodiment uses a field lens 1510, two spherical mirrors 1520, 1530, and two flat mirrors 1540, 1550. For the null path, that is a path without the folded lens train, the beam strikes mirror 1505 which images a first MEMS image onto a second MEMS device (not shown). If a pixel is tipped for a delay at the first MEMS (not shown) the light beam passes below mirror segment 1505 and out of the Fourier spherical cell system to the folded lens train 1500. The light beam passes though the field lens 1510 which creates an image of the light beam from the first MEMS (not shown) on the top spherical mirror 1520 (FIG. 15). This spherical mirror 1520 images the Fourier transform of the light beam onto mirror 1540, which is tipped so that the beam is directed to the lower spherical mirror 1530. Again an image of the light beam from the first MEMS (not shown) is created on the lower spherical mirror 1530. This spherical mirror 1530 images the light beam from mirror 1540 onto mirror 1550. Mirror 1550 has twice the tip angle of mirror 1530 so an image of the light beam is created again on the lower spherical mirror 1530, beside the previous image. Mirror 1530 sends the light beam back onto mirror 1540, which directs the light beam to the top spherical mirror 1520 creating a fourth image of the MEMS, this time on the upper spherical mirror 1520, beside the earlier image. The light beam from Mirror 1540 is imaged through the entrance plane below mirror segment 1505 with a magnification of +1 (the beam exits at the same place it entered) travels back through the spherical lens and onto the second MEMS (not shown). The negative image from the second MEMS is then bounced through the system as described above; the light beam image location is the same whether the beam was delayed through the folding MEMS or not. In this particular example the light beam travels the length of the system eight times; however, any multiple of four passes is possible with the correct number and tilts of the flat mirrors.

Depending on the number of delays desired, a specific number of bounces through the system are provided. The number of delays possible, $N_d$, is related to the number of MEMS segments, $N_m$, as specified in equation 6.

$$N_d = 2^{(N_m-1)} \quad (6)$$

In any situation the first and last MEMS segments are two-state (although three-state MEMS also work; there would just be an unused tip position) and the rest are three-state MEMS.

Figure 17:
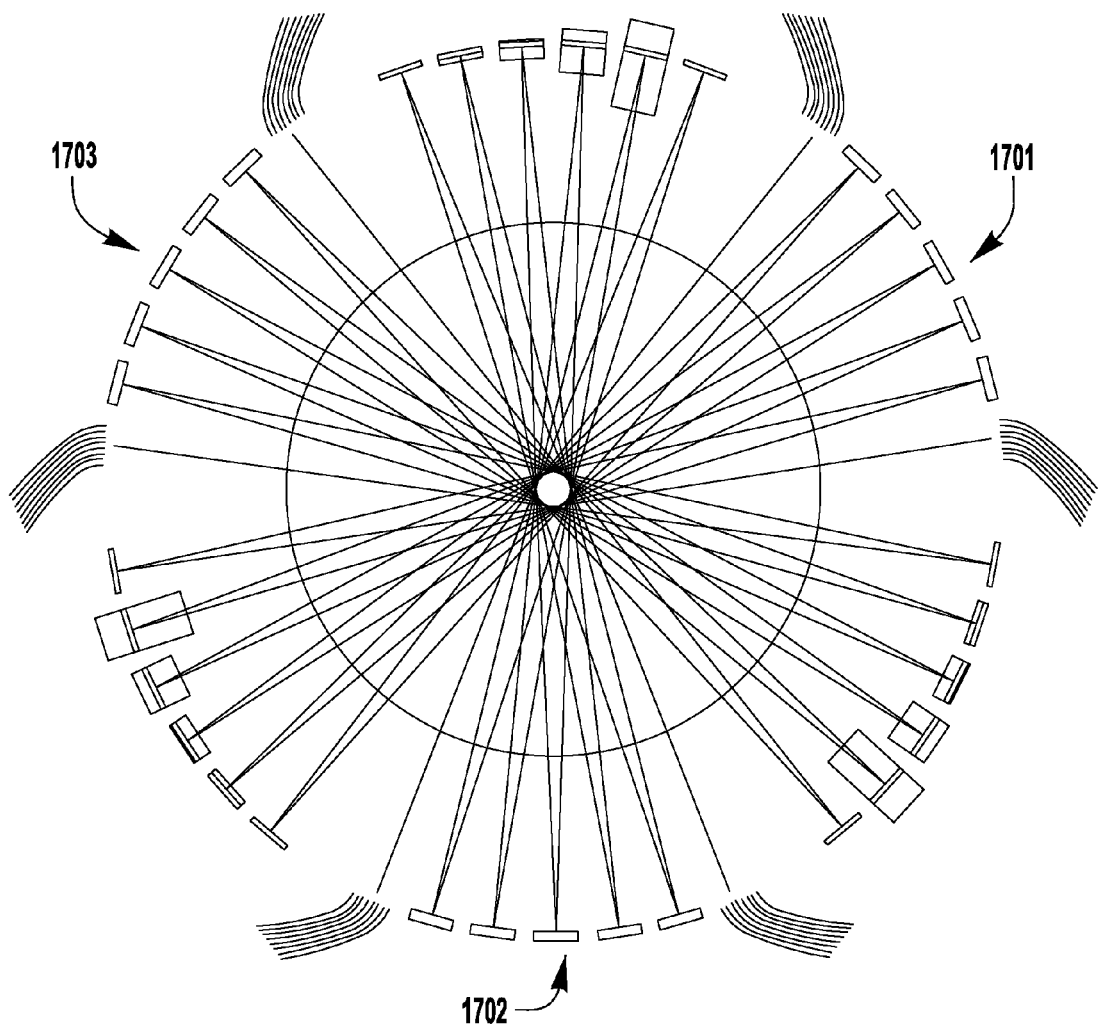
FIG. 17 shows a spherical lens used to provide multiple parallel spherical Fourier cells.

An advantage of this particular exemplary system is that the total volume can be quite small, due to the beams overlapping throughout the system. In addition, because the lens is spherical, it can be used from any direction, allowing several systems to be cascaded around the sphere. FIG. 17 shows several exemplary systems using the same spherical lens. In this embodiment the systems 1701, 1702 and 1703 are in one plane, but it is possible to have systems in other planes around the sphere. For example, a plurality of systems can surround the sphere. For the planar embodiment illustrated, however, an entire spherical lens is not necessary. For example, a section, or portion of a sphere, such as a center disk, could be cut from a sphere and used in accordance with an embodiment of the present invention.

In a practical case there would likely be many more mirror segments around the sphere. For example, over 100 mirror segments may be provided in a single plane. This would be done to keep the angle of incidence going through the spherical lens small enough to make the paraxial equations used valid and reduce beam aberrations.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, components and component relationships can be changed without changing the substantive functions performed by the components and component relationships described herein. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

The systems described herein using a spherical lens is only a subset of systems that can use an optical Fourier transform to two treat different beams differently in the Fourier transform plane (e.g to provide a delay or not). Because all the input beams coincide in one of two places on the Fourier side, beams can be treated differently based on one going to one place and another going to the other and then separate the beams back into the original input arrays for further processing.

Other optical systems such as, for example, those having thin lenses, thick lenses, lens systems or mirror systems may be used to implement the Fourier transforms disclosed herein. As such, the invention is not limited to spherical lenses. In addition, although the example discloses MEMS with tilting micromirrors/pixels, embodiments using any spatial light modulator that switches beams in any of two or three directions may be used. In addition, this invention would work if the MEMS only had two tip angles, however, it would have more components.

In addition, as previously mentioned, the micromirror arrays on the MEMS side don't have to be operational, i.e. they may be permanently tilted in one direction. For example in an optical correlator or in a transversal filter, it is often known which beams require which delays, so a fixed (non moving) micromirror array may be used.

I claim:

1. An apparatus for introducing a true time delay in optical signals comprising:
    an input array for inputting an array of light beams;
    at least a portion of a lens;
    a plurality of micromirrors located at a distance away from the lens that is approximately equal to the focal length of the lens; and
    one or more mirrors located at a distance away from the lens that is approximately equal to the focal length of the lens; and
    one or more delay blocks, at least a portion of which are located at a distance away from the lens that is approximately equal to the focal length of the lens; and
    wherein the micromirrors further comprise a plurality of controllable elements for directing one or more light beams in the array of light beams through the lens and onto either a mirror or a delay block.

2. The apparatus of claim 1 wherein the lens is a spherical lens.

3. The apparatus of claim 1 wherein the plurality of controllable elements comprise pixels.

4. The apparatus of claim 1 wherein the delay block comprises a glass block.

5. The apparatus of claim 1 wherein the delay block comprises a folded lens train or a mirror train.

6. The apparatus of claim 1 wherein a delay is induced by folding the light beams back into through the lens.

7. The apparatus of claim 1 wherein a delay is induced through a folded lens train having a second lens and wherein at least a portion of the folded lens train is located at a distance that is larger than the focal length of the lens.

8. The apparatus of claim 1 wherein the plurality of controllable elements are individually controllable.

9. The apparatus of claim 1 wherein groups of the plurality of controllable elements are collectively controllable.

10. The apparatus of claim 1 wherein the delay block comprises a combination of one or more glass blocks and one or more folded lens trains or mirror trains.

11. A method for introducing a true time delay into an optical signal using a Fourier cell comprising:
- bouncing an array of light beams off of a first micromirror;
- adjusting one or more pixels on the micromirror so that light beams incident on the one or more pixels are directed through at least a portion of a lens onto a first mirror or a first delay block having a first set delay;
- bouncing at least a portion of the light beams off of a second micromirror;
- adjusting one or more pixels on the second micromirror so that light beams incident on the one or more pixels are directed through at least a portion of the lens onto a second mirror or second delay block having a second set delay; and
- repeating any of the previous steps until the desired delay has been introduced into the optical signal.

12. The method of claim 11 wherein the second set delay is twice the first set delay.

13. The method of claim 11 wherein the second set delay is equal to the first set delay.

14. The method of claim 11 further comprising bouncing the one or more light beams outside of the Fourier cell and folding the one or more light beams to induce a delay in the one or more light beams before directing the one or more light beams back into the Fourier cell.

15. The method of claim 11 wherein the delay block is located outside of the Fourier cell.

16. The method of claim 11 further comprising providing one or more glass blocks as the first or second delay blocks.

17. The method of claim 11 further comprising providing one or more lens trains or mirror trains as the first or second delay blocks.

* * * * *